May 12, 1925.
F. R. WALLACE ET AL
RECOIL BRAKE
Filed Sept. 6, 1924
1,537,392
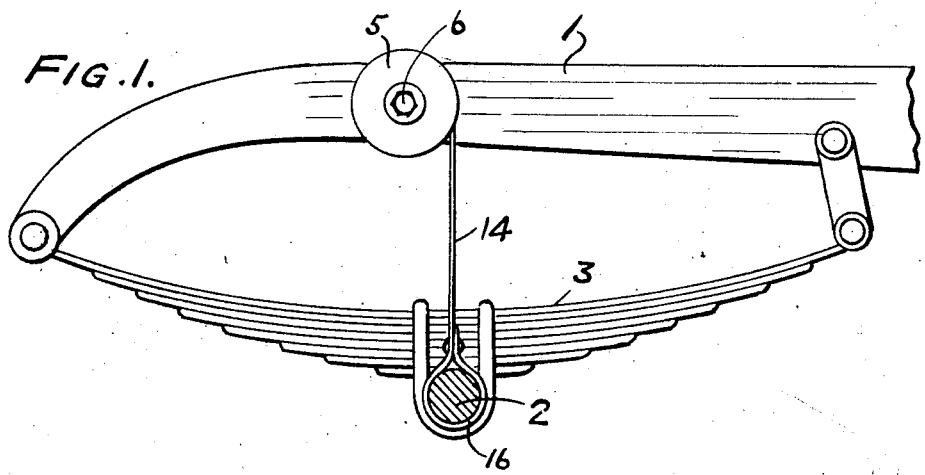
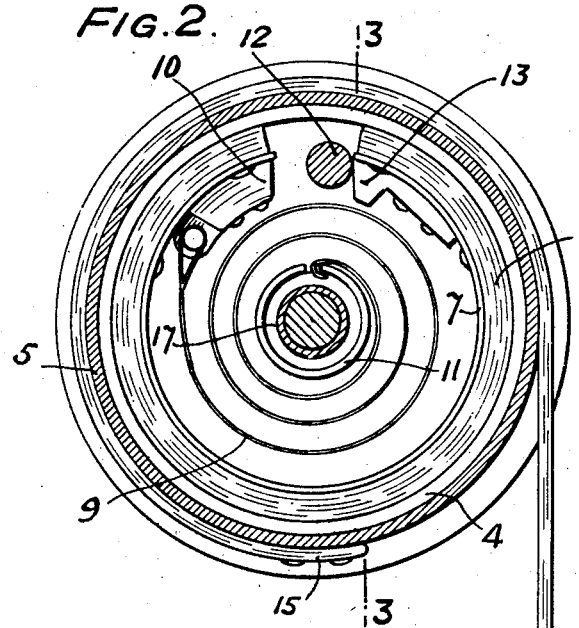
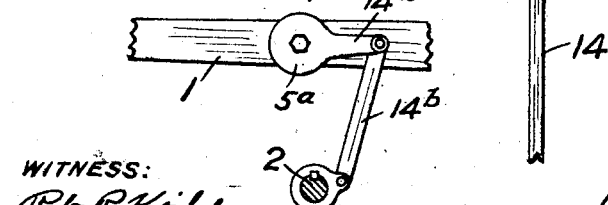
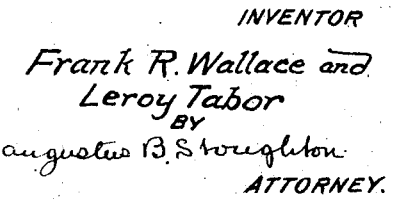
WITNESS:
*Rob R Kitchel*
INVENTOR
Frank R. Wallace and
Leroy Tabor
BY
*Augustus B. Stoughton*
ATTORNEY.

Patented May 12, 1925.

1,537,392

UNITED STATES PATENT OFFICE.

FRANK R. WALLACE, OF PHILADELPHIA, PENNSYLVANIA, AND LEROY TABOR, OF RIVERTON, NEW JERSEY.

RECOIL BRAKE.

Application filed September 6, 1924. Serial No. 736,211.

*To all whom it may concern:*

Be it known that we, FRANK R. WALLACE, a citizen of the United States, residing at Philadelphia, in the county of Philadelphia and State of Pennsylvania, and LEROY TABOR, a citizen of the United States, residing at Riverton, in the county of Burlington and State of New Jersey, have jointly invented a new and useful Improvement in Recoil Brakes, of which the following is a specification.

The principal object of the present invention is to provide a comparatively simple, reliable and durable device for instant action in checking the recoil of a spring. Another object of the present invention is to utilize in such a device a change of pressure on two friction surfaces, to cause the same to check the recoil of a spring. Another object of the invention is to provide a recoil brake especially adapted to satisfactorily control the rebound of the spring of a vehicle so that the riding quality of the latter is improved.

Other objects of the present invention will appear from the following description at the end of which the invention will be claimed but the invention will be first described in connection with the embodiment of it chosen for illustration in the accompanying drawings forming part hereof and in which—

Figure 1 is a side view illustrating an embodiment of the invention in application to parts of a vehicle.

Fig. 2 is a sectional view taken on the line 2—2 of Fig. 3.

Fig. 3 is a sectional view taken on the line 3—3 of Fig. 2, and

Fig. 4 illustrates a modification.

In the drawings 1 and 2 are vehicle frame and axle elements and 3 is a supporting spring interposed between the two. 4 and 5 are concentric casings of which one, 4, is fixed to one of the vehicle elements 1 and of which the other casing, 5, is turnable in the present instance on a bolt or stud 6 by means of which the casing 4 is immovably attached to the frame element 1. 7 is an internal brake band provided with a brake lining 8 for contact with the inner face of the fixed casing. This brake band is shown as of the form of a split ring and when the device is not in use it may be of diameter appropriate for free turning movement in the casing 4. 9 is a retracting spring, shown as a coil spring, and it is attached at one end to one end of the brake band as by means of the coupling 10, and at the other end the spring 9 is attached to the casing 4, as shown, by means of the split drum 11. There is on the movable casing 5 a post or projection 12 adapted to push on the end of the brake band 7, or, more accurately, on the end, shown as beveled, of a fitting 13 provided on the end of the brake band. Externally the casing 5 is shown as of the form of a double flanged pulley and on this pulley face works a band 14, one end 15 of which is secured to the casing 5, and the other end 16 of which is secured to the axle element 2. As shown the casing 5 is provided with a hub 17 turnable on the post 6, and the post 6 is shown as provided with a collar 18 by means of which the casing 4 is secured to the frame element 1.

In use the parts are so adjusted that the spring 9 is under some tension, and this is accomplished by properly proportioning the length of the strap or band 14 when the spring 3 is under what may be called normal load. When in the operation of the vehicle the spring 3 is compressed toward the frame 1, the spring 9 may shift the brake band 7 and with it the casing 5 in counter clockwise direction in Fig. 2, but at the instant of recoil of the spring 3 in starting to assume its normal position as shown in Fig. 1, the strap 14, pulling on the casing 5 in clockwise direction in Fig. 2, causes the post or pin 12 pushing on the end of the brake band to expand the brake band diametrically, thus exerting an instantaneous increase of pressure between the lining 8 and the internal wall of the fixed casing 4, and this increase in pressure, of course, increases the braking action of the device because it increases the friction between the lining and casing 4. The result is that the recoil of the spring 3 is checked at the instant of its occurrence so that the frame element 1 is not thrown upward and good riding qualities are attained. As the spring 3 assumes its normal position the spring 9 operates to re-position the brake band 7 and rewind the strap 14.

In the modification shown in Fig. 4, the connection between the turnable element 5ª and the axle 2, does not wrap around the rim portion of the element 5ª, but is facially connected therewith, and for the purpose of explanation the element 5ª is shown as provided with an arm 14ª connected by a link, rigid strap or the like 14ᵇ to the axle 2. The effective leverage therefore varies according to the angular positions into which the part 5ª turns and this variation can be availed of to effect variation in the degree of application of pressure and friction with regard to the relative positions of the parts 1 and 2.

It will be obvious to those skilled in the art to which the invention relates that modifications may be made in details of construction and arrangement without departing from the spirit of the invention which is not limited as to such matters or otherwise than as the prior art and the appended claims may require.

We claim:

1. A recoil brake comprising the combination with vehicle frame and axle elements and a supporting spring interposed between the two of concentric casings of which the inner one is fixed in respect to one of said vehicle elements and of which the outer one is turnable, an internal brake band provided externally with brake lining and arranged for co-operation with the inner surface of the fixed casing, a retracting spring attached to one end of the brake band and at the other end attached to the fixed casing, a post or projection on the outer movable casing adapted to push on the other end of the brake band, and a strap connected to the other vehicle element and with the exterior of the outer turnable casing.

2. A recoil brake comprising the combination with vehicle frame and axle elements and a supporting spring interposed between the two of concentric casings of which the inner one is fixed in respect to one of said vehicle elements and of which the outer one is turnable, an internal brake band arranged for co-operation with the inner surface of the fixed casing, a retracting spring attached to one end of the brake band and at the other end attached to the fixed casing, a post or projection on the outer movable casing adapted to push on the other end of the brake band, and a strap connected to the other vehicle element and with the exterior of the outer turnable casing.

FRANK R. WALLACE.
LEROY TABOR.